June 3, 1969
V. RAEBER
3,447,550
METHOD AND MEANS FOR CONTROLLING THE DOUBLE
ADJUSTMENT OF A HYDRAULIC MACHINE
Filed May 12, 1966
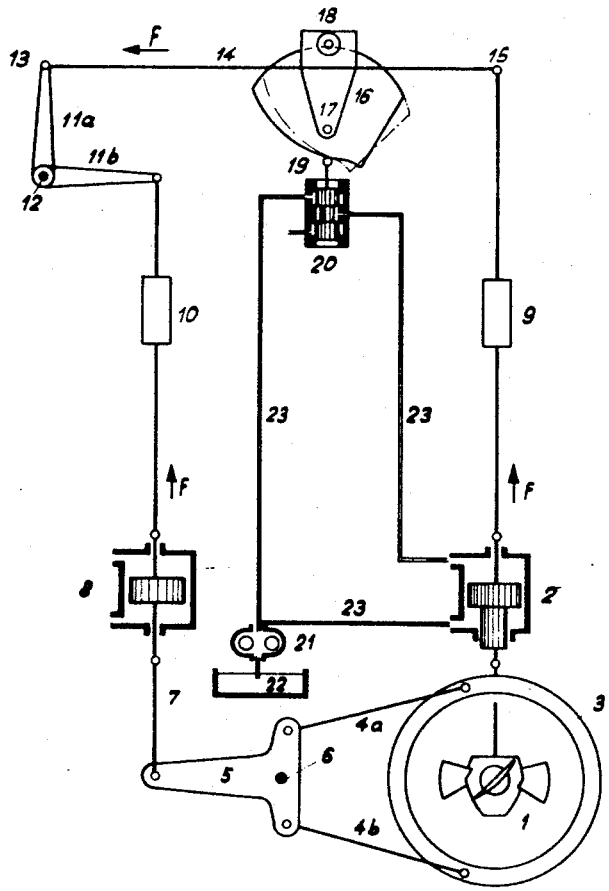
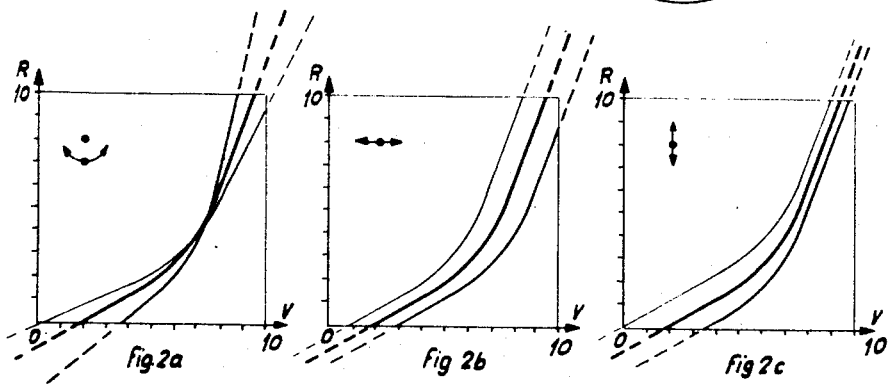
INVENTOR
VICTOR RAEBER
BY Emory L. Groff Jr.
ATTORNEY

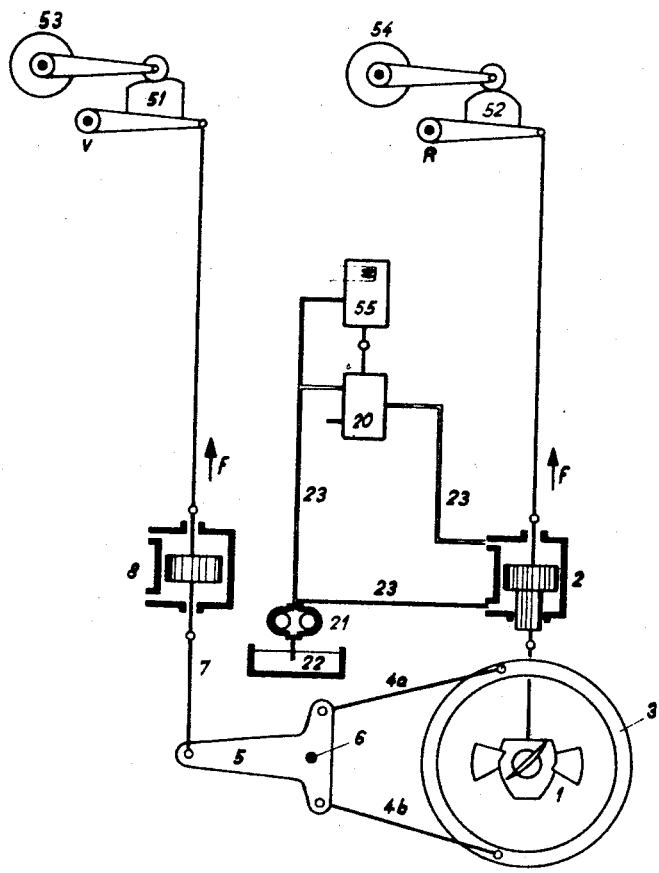

June 3, 1969  V. RAEBER  3,447,550
METHOD AND MEANS FOR CONTROLLING THE DOUBLE
ADJUSTMENT OF A HYDRAULIC MACHINE
Filed May 12, 1966  Sheet 4 of 6
fig. 6
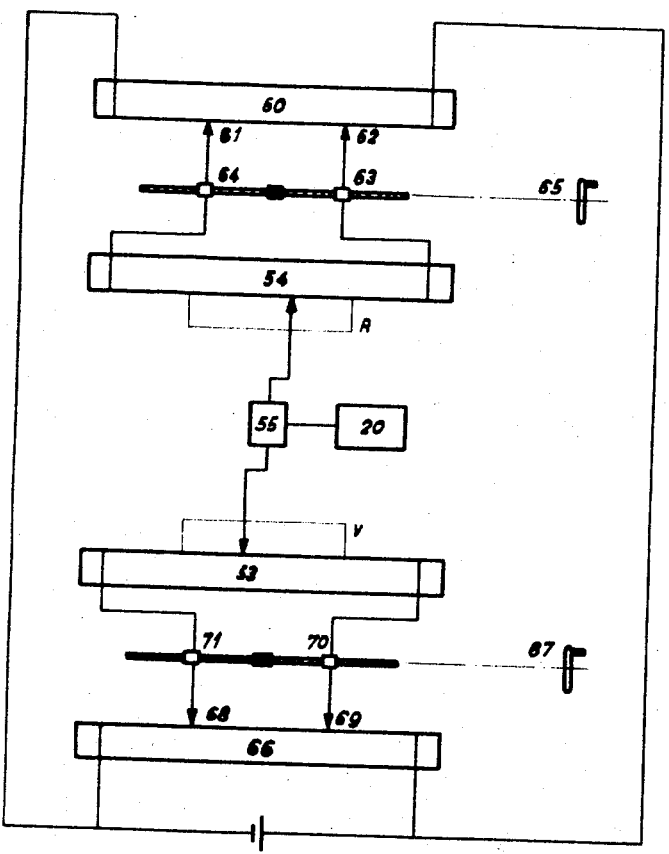
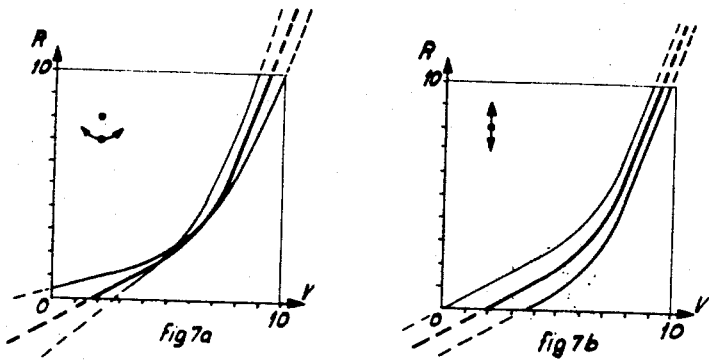
fig 7a  fig 7b
INVENTOR
VICTOR RAEBER
BY  *Emary L. Groff Jr.*
ATTORNEY

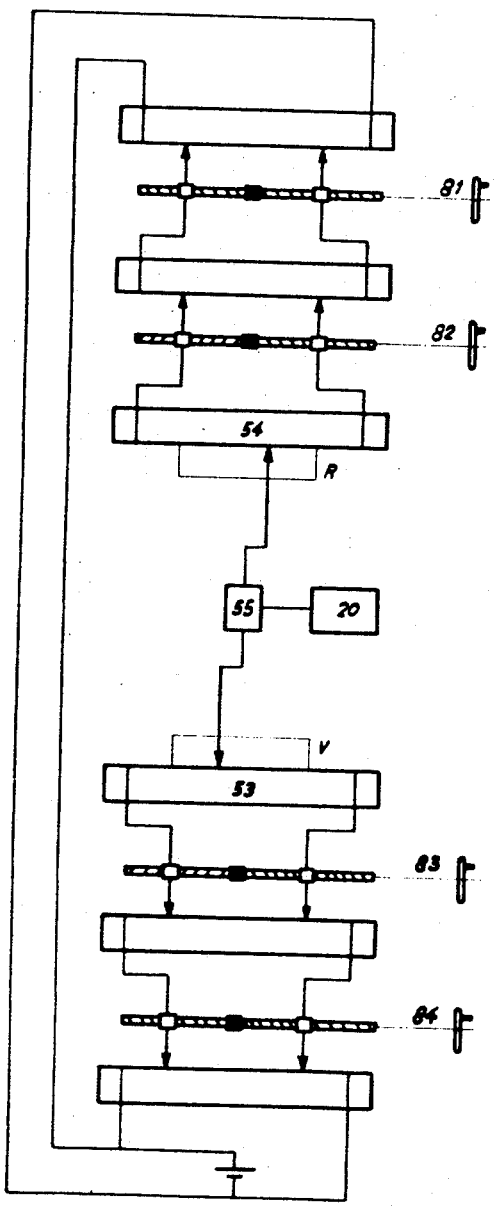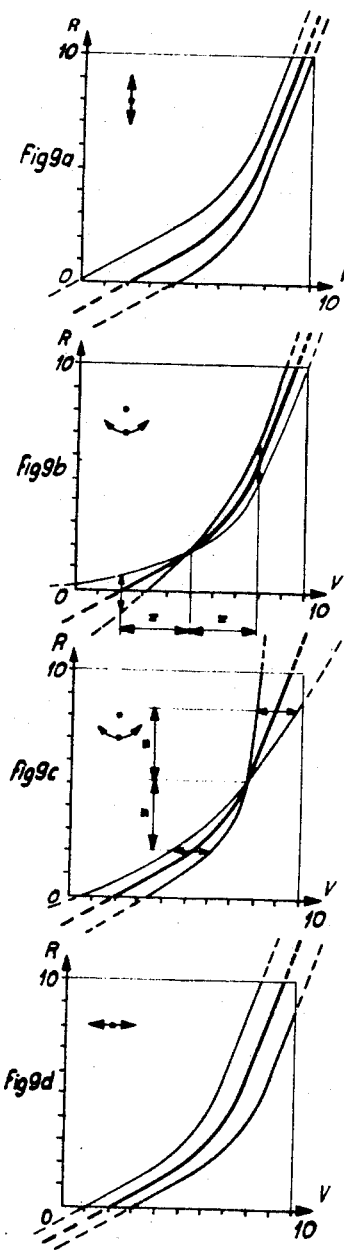

INVENTOR

VICTOR RAEBER

BY Emory G. Groff

ATTORNEY

United States Patent Office 3,447,550
Patented June 3, 1969

3,447,550
METHOD AND MEANS FOR CONTROLLING THE DOUBLE ADJUSTMENT OF A HYDRAULIC MACHINE
Victor Raeber, Vevey, Switzerland, assignor to Ateliers de Constructions Mecaniques de Vevey S.A., Vevey, Vaud, Switzerland, a company of Switzerland
Filed May 12, 1966, Ser. No. 549,570
Claims priority, application Switzerland, May 24, 1965, 7,263/65
Int. Cl. F02c 9/00
U.S. Cl. 137—37                                                5 Claims

ABSTRACT OF THE DISCLOSURE

A Kaplan turbine wherein means are provided so that the gate opening means and the means for adjusting the pitch of the blades of the wheel are coordinated to provide maximum performance by automatically controlling a simplified cam system utilizing electrical and hydraulic means.

Hydraulic machines provided with a double adjustment are nowadays numerous, and they serve advantageously in various plants wherein the operative parameters such as power, loss of head, speed, vary. By way of example, one may mention the case of the Kaplan turbines. The latter drive generally an alternator which supplies the electric energy to the distributing network. The rotary speed is generally constant and depends on the frequency required for the network, but, in contradistinction, the power of the machine may vary within a large range, so as to take into account the requirements of the network or depends on the amount of water output available. The throughput in the machine is adjusted first by a distributor, termed the gating, of which the opening angle defines the power supplied by the machine. The Kaplan turbine, mentioned by way of example, incorporates a second adjusting member which has also an action on the throughput and on the hydraulic behaviour of the machine and which controls the pitch of the blades of the wheel, which justifies the reference to the expression "double adjustment means."

Generally speaking, and for predetermined conditions of structure, experience shows that there corresponds to each position of the first adjusting member constituted by the gating, a single position of the second adjusting member constituted by the blades of the wheel in a manner such that the yield of the machine may be at an optimum value. The regulators controlling the Kaplan turbines are generally equipped with the arrangements required, precisely with a view to controlling two adjusting members constituted by the gating and by the blades of the wheel in a manner such that to each position of the gating there corresponds under stable conditions a position of the wheel blades which ensures an optimum yield. The stable conditions are those which the machine has a tendency to reach after a damping of the adjusting movements produced by a disturbance. In order to reach said object, these regulators are generally provided with at least one cam interconnecting the two adjusting members the shape of which cam ensures under stable running conditions an optimum yield for the machine for all the values of its opening angle.

However, experience shows that the optimum correspondency between the opening values of the two adjusting members depends on the conditions of operation and it is therefore necessary, when the head varies, to deform the cam or to provide a series of interchangeable cams or else a single cam designed for use in all directions of space and of which the operative outline is selected according to requirements. Such arrangements are possible, but they are intricate and expensive.

The invention has for its object an adjusting method and an adjusting system for a hydraulic machine provided with a double adjustment such as a turbine, a pump or a pump turbine, which hydraulic machine operates under throughput conditions which vary according to requirements under conditions of fitting, loss of head and speed which are well defined, said machine comprising at least one auxiliary power unit provided for controlling the position of one of the members adjusting the flow of fluid, at least one auxiliary power unit controlling the position of the other member adjusting the flow of fluid and at least one system for interconnecting the positions of the two members adjusting the flow of fluid in accordance with a predetermined law depending on the hydraulic behaviour of the machine; said interconnecting system is characterized, according to the invention, by the fact that the correspondency between the positions of the members adjusting the flow of fluid may be modified while retaining the same shape of cam, as provided by a modification of its action with a view to compensating for a modification in the hydraulic behaviour of the machine, which modification is provided by at least one modification in the conditions governing the plant.

The accompanying drawing illustrates diagrammatically and by way of example several embodiments of the improved method and means according to the invention. In said drawing:

FIG. 1 is a diagram illustrating the adjustment of a Kaplan turbine equipped with three different cam shifting means.

FIGS. 2a, 2b, 2c illustrate the action of the three cam shifting means of FIG. 1 on the law interconnecting the opening of the gating with the wheel blades.

FIG. 5 is a diagram showing the operation of a Kaplan turbine equipped with electric control and adjusting means.

FIG. 6 is a wiring diagram showing the method according to the invention when resorting to variable impedances of which two serve for the actual control and two others for the shifting of the cam.

FIGS. 7a and 7b illustrate the result obtained by the two cam shifting means illustrated in FIG. 6.

FIG. 8 is a wiring diagram illustrating the method according to the invention when resorting to six variable impedances of which two serve for the actual control and four for the shifting of the cam.

FIGS. 9a, 9b, 9c and 9d illustrate the result obtained by the four cam shifting means according to FIG. 8.

Figure 3:
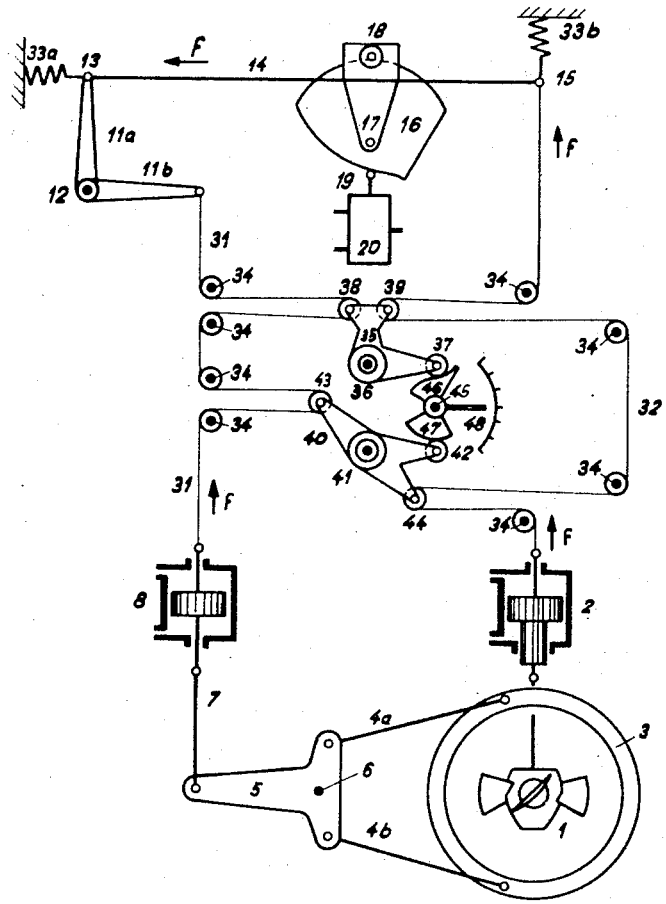
FIG. 3 is a diagram of the control system for a Kaplan turbine provided with two cam shifting means; it shows furthermore an arrangement for measuring the action of said shifting means.

As illustrated in FIG. 1, the arrangement includes the following main parts: the Kaplan wheel 1, the auxiliary means 2 controlling the angular setting of the blades of the wheel, a gating 3, two adjusting links 4a and 4b, a three-arm lever 5, the pivotal point of which is illustrated at 6, a connecting rod 7, the auxiliary means 8 controlling the gating, a length-adjusting member 9 fitted on the rod controlling the wheel, a length-adjusting link 10 for the rod controlling the gating, a double arm lever 11a, 11b pivotally carried by the point 12, and the upper end of arm 11a is connected at pivot point 13 with a bar 14 carrying a cam 16, a pivotal connection 15 between said bar 14 and the means controlling the wheel 1, said cam 16 associating the openings of the gating 3 and the pitch of the wheel blades 17 designates the pivotal point for said cam 16, 18 a mechanism controlling the pivotal position of said cam 16, 19 a feeler for said cam 16, 20 to a slide valve distributor, 21 an oil pump, 22 an oil container, 23 the oil pipes.

The operation of the arrangement illustrated in FIG. 1 is as follows, assuming by way of example the auxiliary hydraulic means 8 controlling the gating has received an order from the regulator which is not illustrated in said diagram, said order consisting in increasing the power supplied by the machine; its piston will be subjected to a vertical downward movement causing the lever 5 to rock round its pivot 6 so as to increase the opening of the gating. At the same time, the link 10 connecting the auxiliary hydraulic means 8 with the lever 11a, 11b is subjected to a vertical downward movement so that said lever 11 rocks round its pivot 12 in a clockwise direction. The lever 11a rigid with 11b and subjected to said rocking movement draws the pivotal connection 13 towards the right hand side together with the bar 14, the cam 16 and the pivotal connection 15.

Said movement of the cam 16 allows a vertical upward movement of the tip of the feeler 19 engaging the cam so that the piston of the slide valve distributor 20 rises and consequently the oil passing out of the container 22 and which is subjected to pressure by the pump 21 flows underneath the upper adjustment ridge of the slide valve 20 so as to enter the upper section of the differential auxiliary hydraulic means 2 controlling the wheel blades.

The oil pressure increases and urges the piston downwardly in said differential auxiliary means 2, so as to urge the oil out of the lower chamber of said auxiliary hydraulic means 2 into the oil circuit passing through the pump. It should be remarked that, the piston being a differential piston, its lower surface is smaller than the upper surface, which allows said return flow to be obtained. The shifting of the piston in these auxiliary hydraulic means leads in its turn to a pivotal movement of the wheel blades in the direction of a larger opening of valve 20. This opening will cease when the slide valve 20 returns into its original position which forms its medial position. It is immediately apparent that the increasing opening of the wheel blades leads to a downward vertical movement of the connecting point 15 and consequently of the cam 16. The movement controlled by the gating ceases as soon as the opening of the blades of the wheel 1 corresponds, in accordance with the law governing their interconnection with the gating, to the opening value assumed now by the gating 3.

Supposing now that the cam 16 is caused to rock round its pivot 17 under the action of the control mechanism 18, FIG. 1 illustrates in dot-and-dash lines a further position for said cam which corresponds, without any modification in the shape of the cam, to a different law governing the interconnection of the wheel blade and gating openings.

FIG. 2a illustrates in solid lines this law governing the interconnection between the positions of the gating given out by the abscissae along the axis O–V and the positions of the wheel defined along the axis of ordinates R. It is immediately found that a rotation of the cam 16 round its pivot 17 illustrated in FIG. 1 has for its result a pivotal movement of the curve showing the interconnecting law round a point which may be shifted.

Similarly, since the length adjusting members 9 and 10 are adapted to increase or decrease the length of the rods transmitting the movement of the auxiliary hydraulic control means to the bar 14 carrying the cam 16, it is possible to thus provide a translational shifting of said cam.

FIGS. 2b and 2c show the action of said adjusting members 9 and 10 on the curve defining the law governing the interconnection considered between the two adjustments.

In FIG. 2b, the member 10 of FIG. 1 is shown as producing a translation of the curve defining the law of interconnection along the axis of abscissae, whereas in the case of FIG. 2c, the adjusting member 9 illustrated in FIG. 1 has produced a translational movement along the axis of ordinates of the same curve. By associating the three above-mentioned actions, to wit a rotation of the cam 16 (FIG. 2a), a translational movement of the latter along the axis of the abscissae (FIG. 2b) and a translational movement thereof along the axis of the ordinates (FIG. 2c), it is possible without modifying the geometrical shape given to the cam 16 to deform in practice, as required, the law of interconnection referred to.

FIG. 3 illustrates another embodiment of the means controlling a Kaplan turbine, a number of members are the same as in the case of FIG. 1 and carry in such a case the same reference numbers 1 to 20. Said FIG. 3 includes furthermore the following other parts: a tape 31 controlling the gating transmits the movements of the auxiliary control means 8 to the lever 11b while a tap 32 controls the wheel and transmits the movements of the auxiliary hydraulic control means 2 for said wheel 1 to the connecting point 15. A tractional spring 33a acts on the tape 31 and similarly a tractional spring 33b tensions the tape 32. A number of stationary transmission pulleys 34 are provided.

Said embodiment includes further more a lever 35 adapted to act in opposite directions when pivoting round its axis 36. Said lever carries a roller 37, a pulley provided on its left hand side and a pulley 39 on its right hand side. The embodiment illustrated includes also a lever 40 adapted to act in parallel directions when it pivots round its axis 41, said lever carrying a roller 42, a pulley 43 on its left hand side and a pulley 44 on its right hand side.

An auxiliary double cam 46, 47 is fitted between the two last-mentioned levers on a lever 48 acting also as a position indicator, rigid with the cam 46, 47 and adapted to pivot round the axis 45. The cam section 46 defines the position of the roller 37 and consequently of the lever 35 ensuring opposite actions while the cam section 47 defines similarly the position of the roller 42 and consequently of the lever 40 ensuring parallel actions.

The operation of the modified embodiment according to FIG. 3 is as follows: Assuming as precedingly that the gating 3 has received an order from the regulator, which is not illustrated, said order consisting in an increase of the power supplied by the turbine, the piston of the auxiliary hydraulic means 8 is subjected to a downward vertical movement which is transmitted by the tape 31 running over the pulleys 34 and the pulleys 43 and 38 to the lever 11b which pivots in a clockwise direction. As precedingly, the bar 14 is subjected to a shifting towards the right hand side. The result is that the slide valve 20 produces a corresponding opening of the blades of the wheel 1. Said opening movement is transmitted through the tape 32 running over the pulley 34 and the pulleys 44 and 39, to the end 15 of the bar 14. The movement of the wheel blades is at an end when the opening obtained for it corresponds to that of the gating in a manner defined by the interconnecting cam 16.

Figures 4A, 4B, 4C:
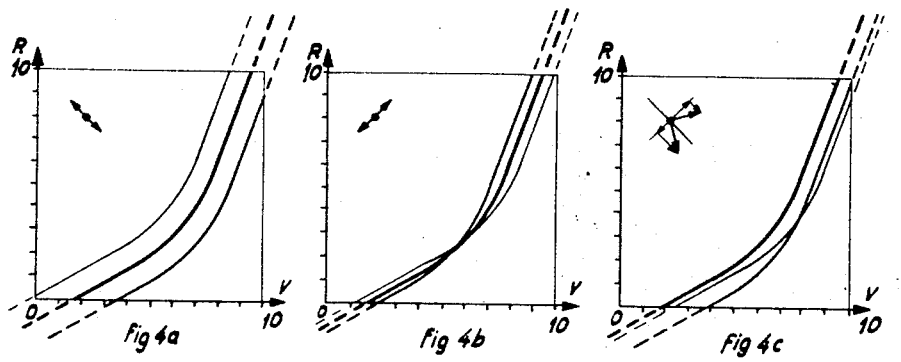
FIGS. 4a, 4b, 4c show the results obtained with the two cam shifting means according to FIG. 3 when either of them is considered singly or else in combination with each other.

Assuming now that the lever 35 is caused to rock in an anticlockwise direction, which has for its result a shifting of the pulleys 38 and 39 towards the left hand side and simultaneously therethrough a sinking of the pivotal connection 15 of the bar 14 and a shifting of said bar from the right hand side towards the left hand side. FIG. 4a illustrates the action of the rocking of the lever 35 round its pivotal point 36 on the curve defining the interconnecting law. Said rocking has a tendency to provide a translational movement of the curve illustrating said law from the upper left hand part of FIG. 4a towards the lower right hand part and conversely according to the direction of rocking which has been selected. It should be remarked that to a given direction of closing of the gating 3 there corresponds a predetermined direction of opening of the blade of the wheel 1. The shifting is therefore executed substantially along a line at 45° between the left hand upper corner towards the left hand lower corner and conversely.

Assuming now that the lever 40 is caused to rock round its pivotal point 41 in an anticlockwise direction, said movement will have the same effect as the preceding movement on the lever 11a, 11b. In contradistinction, it has a reverse action on the pivotal point 15 which is now subjected to an upward vertical movement. In such a case, the result of this shifting is provided in the same direction for the gating 3 and for the blades of the wheel 1. FIG. 4b illustrates said results on the graph illustrating the interconnecting law: the curve of said graph is translationally shifted along a line substantially at 45° extending now from the left hand lower corner towards the upper right hand corner and reversely.

The pivotal movements of the levers 35 and 40 make it possible to resort to a set of two auxiliary cams as obtained by means of the indicating lever 48 carrying the two auxiliary cams 46 and 47 and pivoting therewith round the axis 45. The shape given to the cams 46 and 47 defines therefore the pivotal movement of the levers 35 and 40 and adjusts their action. FIG. 4c illustrates the action, on the curve illustrating the law of interconnection, of the two different rotary movements of the lever 48 providing each two translational movements for the curve illustrating the interconnecting law. It will be remarked that with this control system it is possible to shift the curve illustrating the interconnecting law in parallelism with itself in any direction whatever so as to comply with any modification in the operative conditions of the machine.

If the cams 46 and 47 are given a suitable shape, the angular position of the lever 48 which forms also an indicator may correspond for instance to a drop in pressure. A machine incorporating such an arrangement transforms thus its law or interconnection between the opening of the gating and the angular setting of the wheel blades in accordance with a drop in pressure through a translational movement of the action of the cam 16 without any modification of the cam 16 itself.

Nowadays hydraulic machines are frequently adjusted by electric or even electronic regulators. The improved method according to the invention may therefore be applied also in such cases.

Figure 11:
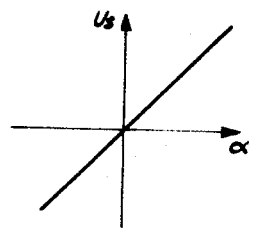
FIG. 11 illustrates the electric behaviour of a magnetic part according to FIG. 10.

FIG. 5 illustrates a diagram for the adjustment of an arrangement incorporating the same parts as precedingly but, in this case, the means transmitting to the regulator the position of the gating and of the wheel blades are constituted by electric parts such for instance as rheostats, condensers, variable induction coils, variometers and the like. Such parts are controlled by the movements of the gating or of the wheel blades and transform the data corresponding to the position of said gating or blades into any desired electric magnitude, for instance as illustrated in FIG. 11 wherein output voltages proportional to pivotal angles are produced.

The diagram illustrated in FIG. 5 includes the parts carrying the reference numbers 1, 2, 3, 4, 5, 6, 7, 8 and 20, 21, 22, 23 which are the same as precedingly. 51 designates a cam connected with the gating elements 3, 4a, 4b, 5, 6, 7 and 8 and designated generally as V while 52 designates a cam rigid with the means controlling the blades of the wheel 1 of the machine. 53 and 54 designate electric transmitters controlled thereby, the position of which are thus defined by the gating V and by the blades of the wheel 1 respectively. 55 designates an electrohydraulic actuator which provides a correspondency between each electric magnitude produced by the regulator of the machine, which is not illustrated in the diagram, and a position of the slide valve 20. It should be remarked that said FIG. 5 shows two cams one of which 51 is secured to the gating V while the other cam 52 is connected with the blades of the wheel 1 whereas theoretically a single cam is sufficient. With a plurality of cams, it is possible however to give each of them the optimum shape so that the dynamic behaviour of the machine may be thereby improved. The interconnecting law depends thus on the shape of the two cams 51 and 52.

The operation of such an arrangement is illustrated in FIG. 6. For its description, rheostats have been retained as an example but obviously a similar description can be made with condensers or variable induction coils. FIG. 6 shows at 60 a double variable symmetrical rheostat provided with two symmetrically arranged output terminals 61 and 62 the positions of which are controlled by screws 63 and 64 which are respectively of a right hand and left hand pitch.

The positions of the output terminals are controlled manually by a handwheel 65 acting on said screws. A rheostat 54 controlled by said wheel corresponds to the member 54 of FIG. 5 and similarly the actuator 55 controls the position of the slide valve 20 which has the same action as the slide valve 20 of FIGS. 1, 2 and 5 and the same is the case for the rheostat 53 which is controlled by the gating and which corresponds to the member 53 in FIG. 5. Lastly, the arrangement described includes a second variable rheostat 66 similar to the rheostat 60, but the shifting of the tappings of which is executed in the same direction. The hand-controlled wheel 67 is adapted to produce this shifting in the same direction of the tappings 68 and 69 which are both carried along by two screws 70 and 71 of similar pitches.

The values of the resistance of the rheostat 54 depend on the position of the blades of the turbine wheel, whereas the values of the resistance of the rheostat 53 depend on the position of the gating. The value of the resistance 55 forming the actuator is very high, so that the electric current flowing therein may be very weak and produce only negligible drops in voltage. An unvarying electric voltage U is fed across the ends of the rheostats 60 and 66; the difference in voltage between the tappings 61 and 62 depends on the spacing between the latter. Said difference is zero if the spacing is also zero and is at a maximum and reaches the value U if the spacing corresponds to that of the outer terminals. The absolute sum of the values of the voltages across the tappings 61 and 62 is constant.

The difference in voltage between the tappings 68 and 69 is, in contradistinction, always the same since the spacing between the two tappings moving in unison is unvarying. However, the absolute sum of the values of the voltages on said tappings 68 and 69 depends on the position of said tappings.

The electric current flowing through the actuator 55 depends as to intensity and direction on the position of the tappings on the resistances 54 and 53 and on the absolute values of the voltages on the tappings 61 and 62 which feed the rheostat 54 and on the tappings 68 and 69 which feed the rheostat 53. Under normal running conditions, these last four tappings are stationary. The electric current passing through the actuator 55 shifts the slide valve 20, which in its turn produces through the agency of the oil circuit a movement of the auxiliary means controlling the angular position of the wheel blades in a direction such as will compensate the cause which has produced said movement. Said shifting controls in its turn the rheostat 54 in a direction adapted to reduce the electric current passing through the actuator 55.

By way of example and as illustrated in the diagram, it is assumed that the wheel blades are closed too much with reference to the requirements of the interconnecting law. The tapping on the rheostat 54 is too much on the right-hand side and the actuator 55 produces a movement of the auxiliary means controlling the wheel blades, with a view to shifting said tapping on the rheostat 54 towards the left-hand side. The current passing through the actuator 55 is thus reduced and the adjusting movement stops when the voltages on the tappings of the rheostats 53 and 54 are equal.

The rheostats 60 and 54 being symmetrical, their middle points are both at the same voltage, whatever may be the position of the tappings 61 and 62. The symmetrical shifting of these two tappings is equivalent to a tilting movement with reference to its middle point of the curve defining the voltage of the rheostat 54 connected with the blades of the wheel as a function of the opening of the latter.

In contradistinction, the shifting in unison of the tappings 68 and 69 on the rheostat 66 leads to a translational movement, in parallelism with the axis giving out the opening values of the gating, of the curve defining the voltage of the gating voltage as a function of the opening of the latter.

FIGS. 7a and 7b illustrate both cases. FIG. 7a shows the result of two movements of the hand-wheel 65. The law of interconnection is illustrated by the curve which pivots thus round a point which may be adjustable. FIG. 7b shows the result of two movements of the hand-wheel 67, in which case the curve illustrating the law of interconnection is shifted in parallelism with the axis corresponding to the modifications of the gating.

FIG. 8 illustrates a further possible arrangement, wherein the elements of FIG. 6 are associated in a symmetrical manner. Each system controlling the gating and the wheel blades includes means for pivotally and translationally moving the interconnecting cam. The rheostats and tappings controlled by 81 and 84 are identical with and correspond to the elements 60, 61, 62, 63, 64 and 65 of FIG. 6. Similarly the rheostats and tappings controlled by the hand-wheels 82 and 83 are identical with and correspond to the elements 66, 67, 68, 69, 70 and 71 of said FIG. 6.

FIGS. 9a to 9d illustrate the action of the hand-wheels 81, 82, 83, 84 which are provided for shifting the curve illustrating the law interconnecting the openings of the gating and the angular setting of the wheel blades. FIG. 9a shows the action of the hand-wheel 81 which produces a translational movement of such a curve in parallelism with the axis defining the angular setting of the wheel blades.

FIG. 9d illustrates the action of the hand-wheel 84 which produces also a translational movement of such a curve, but in this case in parallelism with the axis defining the opening of the gating.

FIGS. 9b and 9c show the result of the operation of the hand-wheels 82 and 83 which allow each a pivotal movement of said curve with a deformation of the latter.

In FIG. 9b, all the points located at a same distance in a horizontal direction of a medial point, which distance is measured in parallelism with the axis defining the openings of the blade wheel, are subjected to a vertical shifting which is the same for all of them, as measured in parallelism with the axis defining the setting of the wheel blades.

In the case of FIG. 9c, in contradistinction, all the points located at a same vertical distance of another medial point are subjected to a same horizontal shifting. FIG. 9 shows that four possibilities are afforded which allow, in practice, shifting and deforming as desired the curve defining the law interconnecting the openings of the gating and the angular setting of the wheel blades, while retaining the same interconnecting cam or cams.

Figure 10:
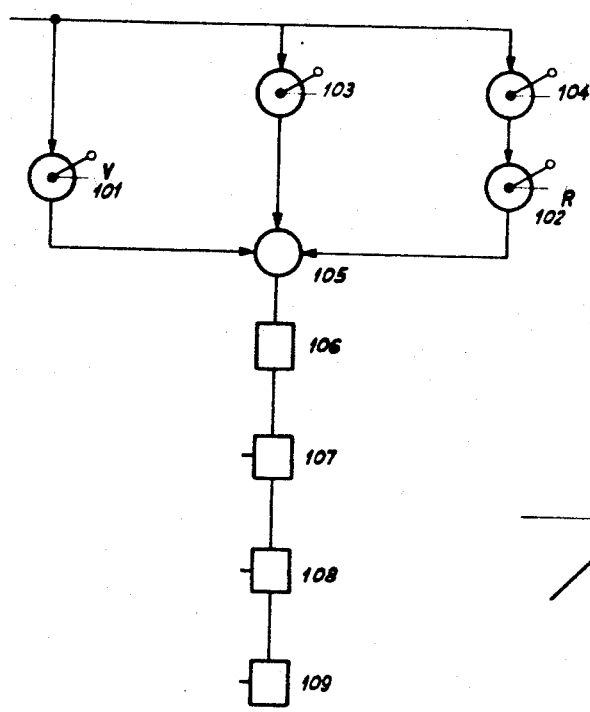
FIG. 10 is a diagram showing the electric control system, resorting to magnetic parts and incorporating two cam shifting means.

FIG. 10 illustrates a further embodiment wherein the rheostats are replaced by variometers, that is by transforming means such that the transformation ratio may be a function in particular of the position of one of the elements of the circuit with reference to another. Often, said variometers include a rotor and a stator. For a predetermined relative position thereof, the voltage fed by a variometer is equal to zero and for another position, it forms an alternative current voltage of a predetermined amplitude. For symmetrical positions of the variometer with reference to that for which the output is zero, the voltage has the same amplitude, but is phase-shifted by 180°. The variometers operate as rheostats and feed a voltage which is substantially proportional to angular values. As illustrated in FIG. 11, the negative and positive values of the alternative current voltages are in practice in phase opposition.

FIG. 10 illustrates an arrangement of the variometers and the like instruments, which allows reaching the desired object. Said FIG. 10 includes the following main components: a variometer 101 controlled by a gating and corresponding to the element 53 of FIG. 5, a variometer 102 controlled by the blades of the wheel and corresponding to the element 54 of FIG. 5, a variometer 103 providing a translational movement of the curve illustrating the law of interconnection, a variometer 104 controlling a rotary movement of the curve defining said law. The variometers 103 and 104 may be identical with each other and with the variometers 101 and 102. The element 105 forms adding means and is constituted by a connecting point at which is produced an algebraic sum of the input voltages so as to form an output voltage which is equal to the sum of the voltages fed by the variometers 101, 102, 103. The block 106 illustrates symbolically a demodulator which transforms into a direct current voltage the alternative current voltage produced at 105. The element 107 is an energy amplifier which increases the energies to be considered. The element 108 is an actuator similar to the element 55 of FIG. 5. The element 109 is a distributing slide valve corresponding to that illustrated at 20 in FIGS. 1, 3 and 5.

The operation of said arrangement is as follows:

The means controlling the wheel are stationary as long as the distributing slide valve 109 is in the middle of its track. Said position is obtained when the actuator 108 is not fed with any electric current. This is the case when the sum of the voltages fed by 105 is equal to zero. It will be assumed, so as to make the disclosure clearer, that the variometer 103 occupies a position such that its output voltage is zero. In order that the voltage at the summing point 105 may be equal to zero, it is necessary for the voltages produced by the variometers 101 and 102 to be both equal to zero, or else equal and in opposite phase relationship. If the element constituted by the variometer 101 associated with the gating produces a voltage higher than that produced by the element 102, the chain of appliances 105, 106, 107 and 108 produces a shifting of the distributing slide valve 109 such that the latter urges the wheel blades in a direction adapted to cut out the cause producing said shifting. The means controlling the blades of the wheel move consequently until the voltage produced by the corresponding variometer 102 is equal to and in opposite phase relationship with that produced by the variometer 101 associated with the gating. There is therefore, in an arrangement of this type, a predetermined relationship between the opening of the gating and the angular setting of the wheel blades. The law of correspondency or interconnection is as precedingly defined by the cams 51 and 52 of FIG. 5.

It is immediately apparent that, when feeding the summing point 105 with a similar voltage produced by a variometer, there is obtained a modification in such a relationship which produces a translational movement of the curve defining the law of interconnection. The variometer 104, the secondary of which feeds the primary of the variometer 102 modifies its transformation ratio. It is an easy matter to show that to each displacement of the variometer 104, there corresponds a rotary movement of the curve defining the interconnecting law.

Figure 12:
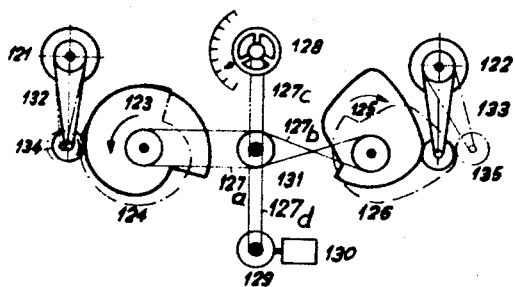
FIG. 12 illustrates an embodiment of a control system for two cam shifting means.

FIG. 12 illustrates an embodiment which allows measuring the shifting of the curve defining the interconnecting law. Said embodiment includes the following main components: an instrument 121 corresponding for instance to the variometer 103 of FIG. 10 or to the rheostats 66 to 71 of FIG. 6, an instrument 122 corresponding for instance to the variometer 104 or to the rheostats 60 to 65 of the same figures, a control cam 123 adapted to pivot round the point 124, a further cam 125 adapted to pivot round the point 126, a handwheel 128 provided with indicating means, an electric motor 129, a transmitter of position signals 130, a central wheel 131 and chains 127a and 127b connecting the cams 123 and 125 with the central wheel 131 and chains 127c and 127d connecting the hand-wheel 128 and motor 129 respectively with the same central wheel 131.

The operation of the arrangement according to FIG. 12 is as follows: The central wheel 131, the angular position of which is controlled by the hand-wheel 128 through the chain 127c controls in its turn through the chains 127a and 127b the angular positions of the two cams 123 and 125 pivoting respectively round the points 124 and 126; the shape of said cams is designed in a suitable manner and rollers or cam followers 134, 135 are urged against said cams by the levers 132, 133 subjected to the action of springs which are not illustrated and controlling the corresponding instruments 121 and 122. To each position of the hand wheel 128, there corresponds an angular setting of the rotor of the instrument 121 and an angular position of the rotor of the instrument 122.

Said arrangement allows thus measuring the relative action of the two elements adapted to shift the curve defining the law interconnecting the openings of the gating with the pitch of the wheel blades. The angular setting of the hand wheel 128 may be shown by a scale of drops in head. It is obvious that the hand wheel 128 may be controlled by a remote power unit 129. Its position may, in its turn, be transmitted to a remote point by a transmitter 130 producing a signal giving out the position occupied by the hand wheel 128. Said FIG. 12 shows how it is possible to define the action produced by the two elements shifting the curve defining the interconnecting law. Other embodiments for three, four and more elements shifting the curve are obviously also possible. Taking into account said remote control, it is an easy matter to imagine automatic adjustment means such for instance that the drop in head controls automatically the angular position of the hand wheel 128, so that the latter may follow permanently the modifications of said drop. The above description has been made in the case of variometers and rheostats, but other instruments may also be used such for instance as variable condensers and the like.

The present invention is also applicable to hydraulic machines other than Kaplan turbines, provided they are subjected to a double adjustment and they resort at least to one adjustment-interconnecting cam. This is the case, for instance, for Deriaz turbines, helical pumps, tide-controlled machines which are to operate alternatingly as a turbine and as a pump for both directions of flow of the water during ebb and tide.

I claim:
1. In a hydraulic machine operating under predetermined operative conditions and under variable throughput conditions, comprising two independent means adjusting the flow of the hydraulic fluid and auxiliary means controlling the position of each of said adjusting means, means interconnecting the positions of said auxiliary means and including an undeformable cam system the movements of which are adapted to produce the desired modifications in the law governing the interconnection between said adjusting means thereby to take into account any modifications in the operative and throughput conditions of the machine, and means adapted to control the movements of the cam system, which means is sensitive to a drop in head of the hydraulic fluid.

2. A hydraulic machine as claimed in claim 1, including means whereby modifications in the drop of head in the machine act on the means controlling the cam system to produce automatically a modification in the relationship defined by said law between the positions of the two adjusting means.

3. A hydraulic machine as claimed in claim 1, wherein the means controlling the position of the adjusting means include electric elements the electric magnitudes of which are controlled by the position of the cam system and means whereby said magnitudes are adapted to act on said law governing the relationship between the positions of the two adjusting means.

4. A hydraulic machine as claimed in claim 1, wherein the means controlling the position of the adjusting means include electro-magnetic elements the magnetic action of which is controlled by the position of the cam system and means whereby said magnetic action is adapted to act on said law governing the relationship between the positions of the two adjusting means.

5. A hydraulic machine according to claim 1, wherein the cam-controlling means include at least two sections acting independently on the cam system and means defining the relative action of said sections to obtain the desired modification in said law governing the relationship between the positions of the two adjusting means.

References Cited
UNITED STATES PATENTS

| | | | |
|---|---|---|---|
| 2,209,987 | 8/1940 | Martin | 137—34 |
| 2,898,925 | 8/1959 | Avery | 137—35 |
| 3,063,460 | 11/1962 | Krauss | 137—35 X |
| 3,275,008 | 9/1966 | Kerensky | 137—36 X |
| 3,339,567 | 9/1967 | Fukasu | 137—36 X |
| 3,339,568 | 9/1967 | Kerensky | 137—36 X |

CLARENCE R. GORDON, *Primary Examiner.*